(12) United States Patent
Park et al.

(10) Patent No.: US 9,204,300 B2
(45) Date of Patent: Dec. 1, 2015

(54) METHOD FOR PROVIDING SIM PROFILE IN EUICC ENVIRONMENT AND DEVICES THEREFOR

(71) Applicant: KT CORPORATION, Seongnam-si, Gyeonggi-do (KR)

(72) Inventors: Chul Hyun Park, Seoul (KR); Kwan Lae Kim, Seoul (KR); Joo Young Kim, Seoul (KR); Jin Hyoung Lee, Seoul (KR); Hyung Jin Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 13/901,094

(22) Filed: May 23, 2013

(65) Prior Publication Data

US 2014/0031012 A1    Jan. 30, 2014

(30) Foreign Application Priority Data

May 24, 2012   (KR) .................. 10-2012-0055602
May 22, 2013   (KR) .................. 10-2013-0057638

(51) Int. Cl.
*H04M 3/16*     (2006.01)
*H04W 12/06*    (2009.01)
*H04L 29/06*    (2006.01)
*H04W 8/18*     (2009.01)

(52) U.S. Cl.
CPC ........... *H04W 12/06* (2013.01); *H04L 63/0853* (2013.01); *H04L 63/102* (2013.01); *H04W 8/183* (2013.01)

(58) Field of Classification Search
CPC . H04L 63/0853; H04L 63/102; H04W 12/06; H04W 8/183; H04W 12/04; H04W 8/20; H04W 12/08; H04W 4/001; H04W 4/003; H04W 48/18

USPC .......................... 455/411, 410, 418
See application file for complete search history.

(56) References Cited

U.S. PATENT DOCUMENTS

| | | | |
|---|---|---|---|
| 2010/0213591 A1 | 8/2010 | Ho et al. | |
| 2011/0306318 A1 | 12/2011 | Rodgers et al. | |
| 2012/0108204 A1* | 5/2012 | Schell et al. ................. | 455/411 |
| 2012/0108206 A1* | 5/2012 | Haggerty ..................... | 455/411 |
| 2012/0108207 A1* | 5/2012 | Schell et al. ................. | 455/411 |
| 2012/0260086 A1* | 10/2012 | Haggerty et al. ............ | 713/150 |
| 2012/0331292 A1* | 12/2012 | Haggerty et al. ............ | 713/168 |
| 2013/0191884 A1* | 7/2013 | Leicher et al. ................ | 726/4 |
| 2014/0045460 A1* | 2/2014 | Park et al. .................... | 455/411 |
| 2014/0099916 A1* | 4/2014 | Mallikarjunan et al. ..... | 455/406 |

FOREIGN PATENT DOCUMENTS

| KR | 20100095268 A | 10/1993 |
|---|---|---|
| KR | 10-2009-0019879 A | 2/2009 |
| KR | 1020130008666 A | 1/2013 |

* cited by examiner

*Primary Examiner* — Kashif Siddiqui
*Assistant Examiner* — Mong-Thuy Tran
(74) *Attorney, Agent, or Firm* — Sughrue Mion, PLLC (57) ABSTRACT

There are provided a method of providing a SIM profile, and an eUICC device. The method of providing the SIM profile includes downloading a SIM profile application selected by a user who uses the eUICC device from an app store, executing and installing the SIM profile application in the eUICC device, accessing of the eUICC device having the SIM profile application installed therein to an operator server, and authenticating the eUICC device based on SIM profile information corresponding to the SIM profile application. The eUICC device includes a network connection unit configured to access the app store via a local network, a SIM profile storage configured to store the SIM profile application, and an authentication requesting unit configured to access the operator server based on the SIM profile information.

12 Claims, 5 Drawing Sheets

METHOD FOR PROVIDING SIM PROFILE IN EUICC ENVIRONMENT AND DEVICES THEREFOR

CLAIM FOR PRIORITY

This application claims priority to Korean Patent Application No. 10-2012-0055602 filed on May 24, 2012, and No. 10-2013-0057638 filed on May 22, 2013, in the Korean Intellectual Property Office (KIPO), the entire contents of which are hereby incorporated by reference.

BACKGROUND

1. Technical Field

Example embodiments of the present invention relate to an embedded universal integrated circuit card (eUICC) environment, and more specifically, to technology for providing a subscriber identification module (SIM) profile to an eUICC.

2. Related Art

A universal integrated circuit card (UICC) is a smart card that is inserted into a terminal and used as a module for user authentication of a mobile communication network to which a user subscribes. The UICC may store a user's personal information (for example, short message service (SMS) files and a phonebook), and information on a mobile network operator (MNO) to which the user subscribes (for example, an international mobile subscriber identity (IMSI) and a home public land mobile network (HPLMN)).

The UICC is called a subscriber identity module (SIM) card in a global system for mobile communications (GSM) method, and a universal subscriber identity module (USIM) card in a wideband code division multiple access (WCDMA) method.

When the user installs the UICC in the user's terminal, user authentication is automatically performed using information stored in the UICC, so that the user can conveniently use the terminal. Moreover, when the user replaces the terminal, the user may detach the UICC from an old terminal and install it in a new terminal, to easily replace the old terminal.

By installing the UICC of a desired mobile network operator, it is possible to easily change the mobile network operator and use the terminal.

That is, in an existing UICC environment, a prepared SIM profile is embedded in a separate card according to requirements of the mobile network operator (MNO), and the card is distributed separately from the terminal. In order to subscribe to services of a specific mobile network operator, the user purchases a terminal and a UICC, inserts the UICC into the terminal, activates the terminal according to activation procedures set by the operator, and then uses the terminal.

It is difficult to downsize a terminal which requires a compact size, for example, a terminal for machine-to-machine (M2M) communication, when the terminal is manufactured to have a detachable UICC. Therefore, an embedded universal integrated circuit card (hereinafter referred to as an "eUICC") structure that is a non-detachable UICC has been proposed. In the eUICC, information on user who uses a corresponding UICC needs to be included in a form of an international mobile station identity (IMSI).

In an embedded UICC, which is integrally installed in the terminal, the eUICC is built into the terminal when the terminal is manufactured and released, unlike the existing detachable UICC. Due to its non-detachable physical structure, it is difficult to change the MNO by detaching the eUICC.

An eUICC device having the UICC embedded in the terminal when the device is released needs to manage SIM profile information remotely due to its non-separable physical characteristics of the UICC from the terminal. Therefore, a subscription manager or a profile manager to manage subscriber information has being discussed. Direct communication between terminals (hereinafter, use together with device to device (D2D) communication) refers to a communication method of performing direct data transmission and reception between two adjacent terminals without passing a base station. That is, two terminals perform communication such that each terminal serves as a source and a destination of data.

SUMMARY

Accordingly, example embodiments of the present invention are provided to substantially obviate one or more problems due to limitations and disadvantages of the related art.

Example embodiments of the present invention provide a method of distributing a SIM profile application using an online application store (hereinafter referred to as an app store or App. Store) in an eUICC environment and accessing an operator network for an initial activation using the distributed SIM profile application.

Example embodiments of the present invention also provide an eUICC device that can access the app store via a local network, download the SIM profile application, and access an operator server based on SIM profile information.

Example embodiments of the present invention also provide the operator server that can distribute the SIM profile application to the app store and perform authentication procedures in response to an authentication request and access of the eUICC device.

In some example embodiments, a method of providing a SIM profile includes downloading a SIM profile application selected by a user who uses the eUICC device from an app store, executing the SIM profile application in the eUICC device and installing the application in the eUICC device, and accessing of the eUICC device having the SIM profile application installed therein to an operator server, and authenticating the eUICC device based on SIM profile information corresponding to the SIM profile application.

The method of providing the SIM profile may further include distributing, by the operator server, the SIM profile application to the app store in a form of an application.

In the downloading of the SIM profile application selected by the user who uses the eUICC device from the app store, user unique identification information may be used to access the app store via a local network.

In the downloading of the SIM profile application selected by the user who uses the eUICC device from the app store, a UI or UX provided by the app store may be used.

In the downloading of the SIM profile application selected by the user who uses the eUICC device from the app store, the operator information may be provided and at least one operator SIM profile application may be listed using a category item of the app store.

In the executing of the SIM profile application in the eUICC device and installing the application in the eUICC device, an initial SIM profile may be replaced by the selected SIM profile when the downloaded SIM profile application is executed.

The initial SIM profile may include access information of the app store and may be released being included in the eUICC device.

In other example embodiments, an eUICC device includes a network connection unit configured to access an app store via a local network, a SIM profile storage configured to store a SIM profile application that is downloaded by accessing the app store through the network connection unit, and an authentication requesting unit configured to access an operator server based on SIM profile information.

The network connection unit may access the app store via the local network using user unique identification information.

The SIM profile storage may previously store an initial SIM profile including the access information of the app store when the eUICC device is released.

In the SIM profile storage, the initial SIM profile may be replaced by the SIM profile and installed when the downloaded SIM profile application is executed.

The authentication requesting unit may request authentication of the eUICC device by accessing the operator server based on the replaced SIM profile information.

In still other example embodiments, an operator server includes a SIM profile distributor configured to distribute a SIM profile application to an app store, and a user authentication unit configured to perform authentication procedures in response to an access and authentication request of an eUICC device in which a SIM profile application provided by the app store is downloaded and installed.

The SIM profile distributor may upload the SIM profile application to the app store using a UI provided by the app store.

The user authentication unit may perform the authentication procedures based on personal information associated with authentication and operator information included in the SIM profile of the user's eUICC device.

According to the method of providing the SIM profile of the present invention, it is possible to distribute the SIM profile using the app store that is operated in a variety of forms. Further, it is possible to install the SIM profile using a user-friendly interface such as an app installation. Moreover, in the app store, a history of the used SIM profile per user is managed so that it is possible to manage the history for a user management (advertisement sending, operator recommendation, and plan recommendation).

When the eUICC device according to the present invention is used, limitation of the non-detachable eUICC device may be overcome so that it is possible for the user to activate a terminal regardless of a mobile network operator even in a case of the eUICC.

Moreover, from a view of the operator and a terminal manufacturer, it is helpful to solve product inventory problems and price-increasing problems of the eUICC device.

Furthermore, when the operator server according to the present invention is used, it is possible to update subscriber information of many mobile network operators to the eUICC remotely.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Accordingly, while the present invention is susceptible to various modifications and alternative forms, specific embodiments thereof are shown by way of examples in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

First, terminology used in this application will be briefly described below.

An app store is an abbreviated word of an application store and refers to an online mobile content (software) market that can freely buy and sell a mobile application (a content application installed in a cellular phone, for example, a scheduler, an address book, an alarm, a calculator, a game, a video, Internet access, a music player, a navigator, Word, and Excel), and may be usually regarded as an online application market that can be mounted on a smartphone. The app store may include, for example, a Google's Android app store, online app stores of mobile network operators, and a wholesale app community (WAC) that is a kind of an app wholesale market in which major carriers and manufactures participate.

The terminology "operator" used in this application refers to a mobile network operator (MNO).

Download and play means that digital content such as a video, a sound source, and an application is downloaded to a computer and the computer is able to recognize presence of the content. Therefore, a user does not have to notify the computer of adding of new content.

A subscriber identification module (SIM) refers to a subscriber identification module, and is an essential element of a global system for mobile communications (GSM) terminal. Usually, the SIM may be implemented in a form of an integrated circuit (IC) card. There is usually a slot in a back side of a terminal and this small card is inserted into the slot. The SIM profile refers to a specific group (set) of information parameter values included in the SIM.

Figure 1:
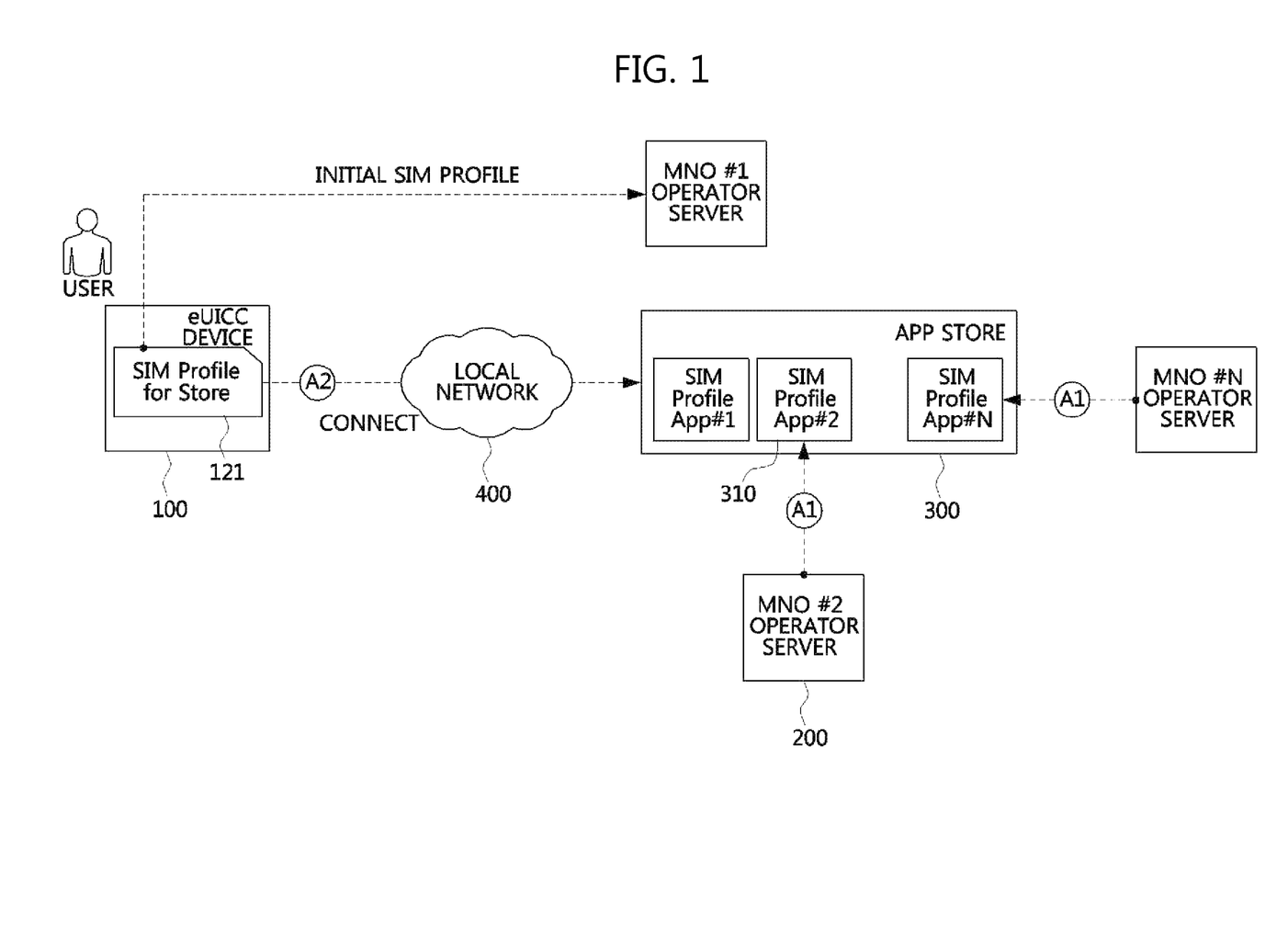
FIG. 1 is a conceptual diagram illustrating a method of providing a SIM profile and components according to an embodiment of the present invention.

FIG. 1 is a conceptual diagram illustrating a method of providing the SIM profile and components according to an embodiment of the present invention.

As illustrated in FIG. 1, a SIM profile providing environment according to the present invention may include an app store 300, an initial SIM profile 121 having information for accessing the app store, an eUICC device 100 having the profile 121 when the device is released, a local network 400 that allows the eUICC device 100 to access the app store 300, each operator server 200, and a SIM profile application 310 that includes user information and operator access information distributed in a form of an application from these servers 200 to the app store 300.

Figure 2:
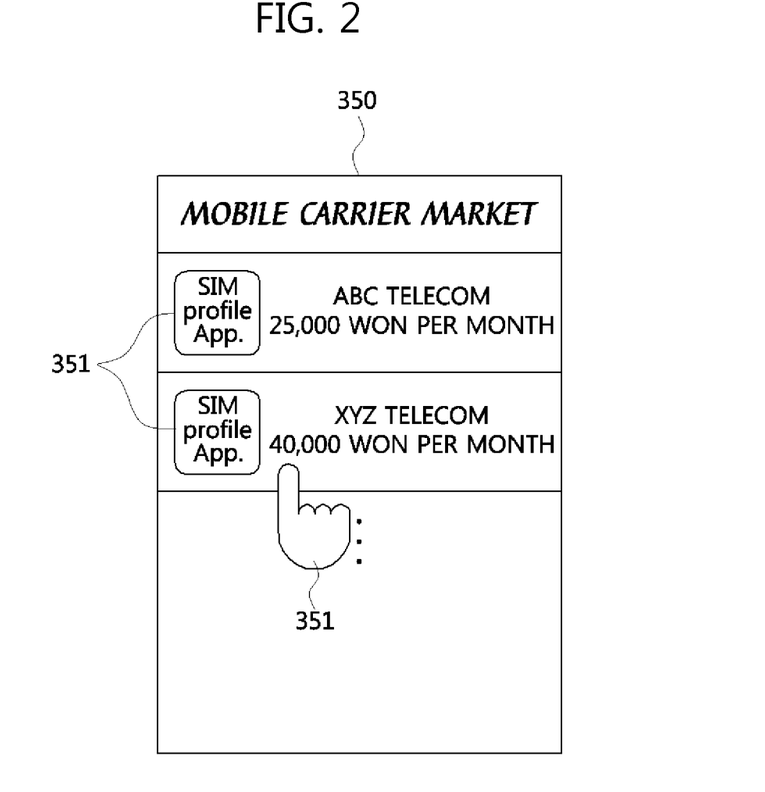
FIG. 2 is an exemplary diagram illustrating a method of providing the SIM profile of an app store according to the embodiment of the present invention.
Figure 3:
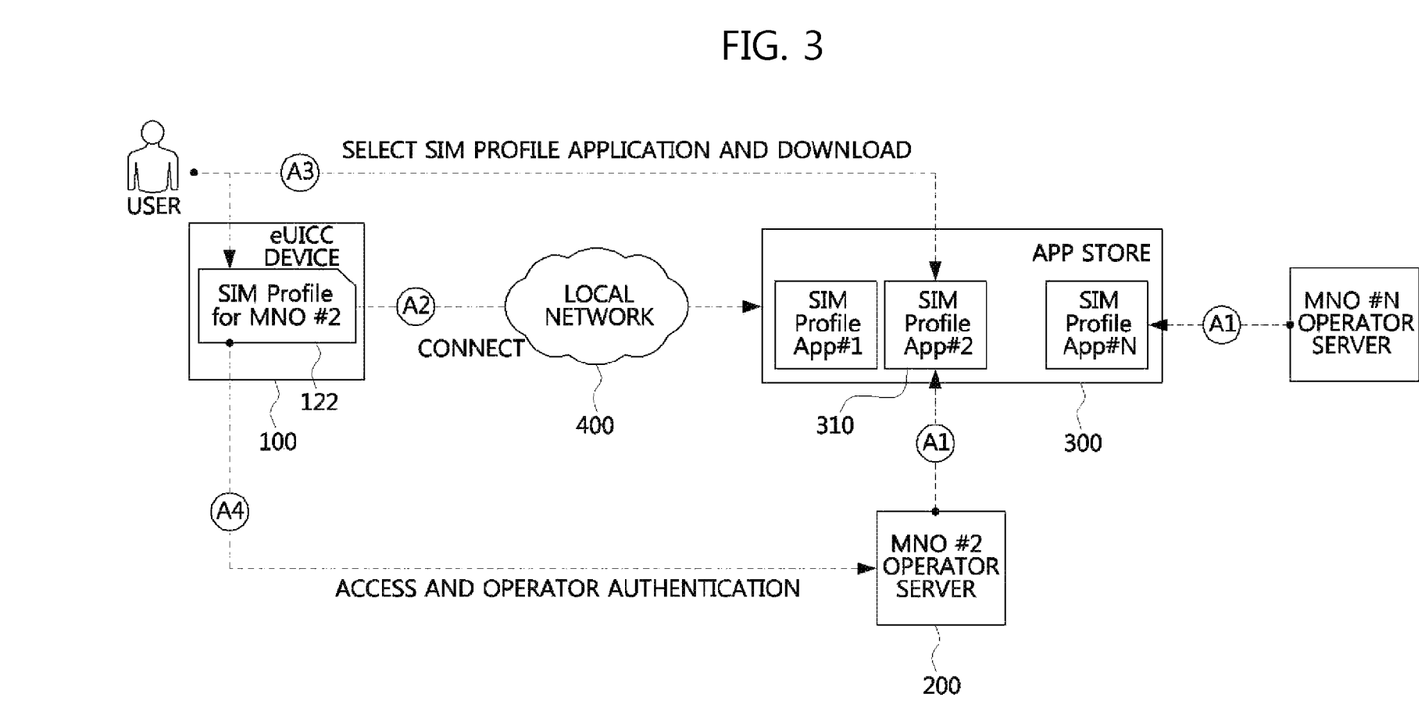
FIG. 3 is a conceptual diagram illustrating a method of providing the SIM profile and the components according to the embodiment of the present invention.

Procedures of providing the SIM profile according to the present invention will be described with reference to FIGS. 1 to 3.

When the eUICC device 100 that has been released to have the initial SIM profile 121 including access information of the app store first boots, the device accesses the app store 300 via a general access network, for example, the local network 400 such as WiFi and a hotspot (A2). In this case, a user uses user unique credentials, for example, an ID and a password, that can identify the user. The user selects an operator 351 to be subscribed using a user interface (UI) or user experience (UX) 350 that is provided by the app store 300 and downloads the SIM profile application 310 distributed (A1) in a form of an application from the operator (A3).

When the downloaded SIM profile application is executed, existing initial SIM profile information is replaced with the SIM profile information provided by the selected operator. After the replaced SIM profile information is invoked using a method such as rebooting and is activated, according to the operator information of the SIM profile information and personal information necessary for authentication, the device accesses the selected operator server 200 and performs activation procedures (A4).

SIM profile providing processes and components according to the present invention will be described below again.

As an initial provisioning method that uses the app store 300, there is provided a method that the operator distributes the SIM profile including operator subscription information and user information in a form of an application to the app store 300.

The method in which the initial SIM profile 121 having the access information of the app store 300 is included when the eUICC device 100 is released is provided, and the method may include an operation (A2) of accessing the app store 300 using the access information of the app store 300.

Moreover, the method may include an operation that lists the SIM profile applications 310 of the operator using a category item of the app store 300, displays associated information, allows the user to select, and securely downloads the SIM profile application 310 of the selected operator to the eUICC device 100 (A3). It is possible to store the SIM profile application downloaded by accessing the app store through the eUICC device in the eUICC device.

It is possible to provide the method that securely replaces the existing initial SIM profile 121 by automatically executing the SIM profile application that is downloaded and stored (download and play). In this case, it is possible to provide the method in which the operator is securely replaced by an operator selected by the user using a replaced SIM profile 122 and the device accesses the selected operator server 200 (A4).

Figure 4:
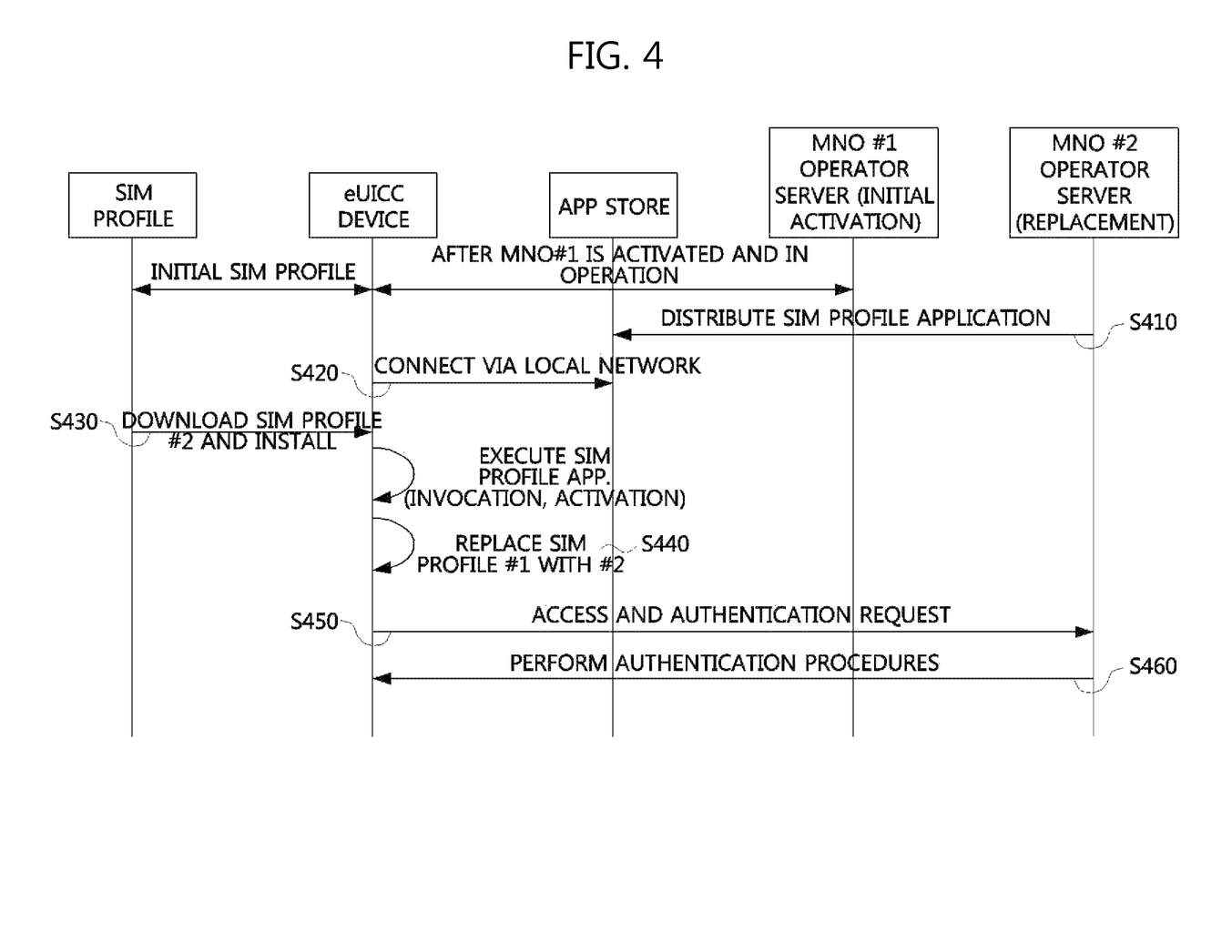
FIG. 4 is a flowchart illustrating a method of providing the SIM profile according to the embodiment of the present invention.

FIG. 4 is a flowchart illustrating a method of providing the SIM profile according to the embodiment of the present invention. The SIM profile providing process will be described step by step with reference to FIG. 4.

The method of providing the SIM profile to the eUICC device 100 may include an operation of downloading the SIM profile application 310 selected by the user who uses the eUICC device 100 from the app store 300 (S430), an operation of executing and installing the SIM profile application in the eUICC device 100 (S440), and operations that the eUICC device having the SIM profile application installed therein accesses the operator server and the eUICC device is authenticated based on the SIM profile information corresponding to the SIM profile application (S450 and S460).

Moreover, the method may further include an operation that the operator server 200 distributes the SIM profile application 310 in a form of an application to the app store 300 (S410).

In the operation of downloading the SIM profile application 310 from the app store 300 (S430), the eUICC device 100 having the initial SIM profile 121 including the access information of the app store 300 may be used. The app store 300 may include an online app store of the mobile network operator and online app stores operated by, for example, a cellular phone manufacturer, a content provider, and an Internet service provider.

The initial SIM profile 121 may be installed in the eUICC device 100 in advance when the eUICC product is released. Further, the initial SIM profile 121 may be a SIM profile with which previous SIM profile information is replaced through downloading the SIM profile application. That is, the user may continuously change a desired mobile network operator through processes of downloading and installing the SIM profile application 310 from the app store.

When the eUICC device 100 first boots, it is possible to access the app store 300 via a general access network, for example, the local network 400 such as WiFi and a hotspot (A2). The user may access the app store 300 using user unique identification information. The user unique identification information may include, for example, user unique credentials, such as an ID and a password that can identify the user.

Since the app store 300 may be operated by the mobile network operator, and a general business operator, for example, the cellular phone manufacturer, the content provider, and the Internet service provider, the user may select the operator 351 to be subscribed using the UI or UX 350 provided by the operator of the app store 300.

In the app store 300, at least one operator SIM profile application 310 may be listed. A category of the SIM profile applications 310 is listed using the category item of the app store 300, and each SIM profile application 310 having the operator information displayed thereon may be provided to the user.

In the operation of executing and installing the SIM profile application 310 in the eUICC device 100, the initial SIM profile information may be replaced with the selected SIM profile information when the downloaded SIM profile application is executed.

The initial SIM profile 121 includes the access information of the app store 300 and may be released being included in the eUICC device 100, or may be the SIM profile 122 with which the previous SIM profile information is replaced through downloading and installing the SIM profile application. That is, the user may continuously change a desired mobile network operator through processes of downloading and installing the SIM profile application 310 from the app store 300.

The method of providing SIM profile according to the present invention will be summarized and described again.

The eUICC device 100 that is released to have the initial SIM profile 121 of an operator 1 may be in operation activated by the operator 1. The server 200 of an operator 2 may distribute the SIM profile application 310 to the app store 300 before or after the eUICC device 100 is activated by the operator 1 and operates.

The eUICC device 100 may access the app store 300 via the local network 400 (S420). The eUICC device 100 may download the SIM profile application 310 of the operator 2 selected in the app store 300 (S430).

When the eUICC device 100 executes, invokes, and activates the installed SIM profile application of the operator 2, it is possible to replace the previous SIM profile 121 information of the operator 1 with the SIM profile 122 information of the operator 2 and install the replaced SIM profile 122 information (S440).

The eUICC device 100 uses the personal information necessary for authentication and the operator information included in the replaced SIM profile 122 information to request access and authentication from the operator 2 server (S450). In response to the request, the operator 2 server 200 may perform authentication procedures (S460).

Figure 5:
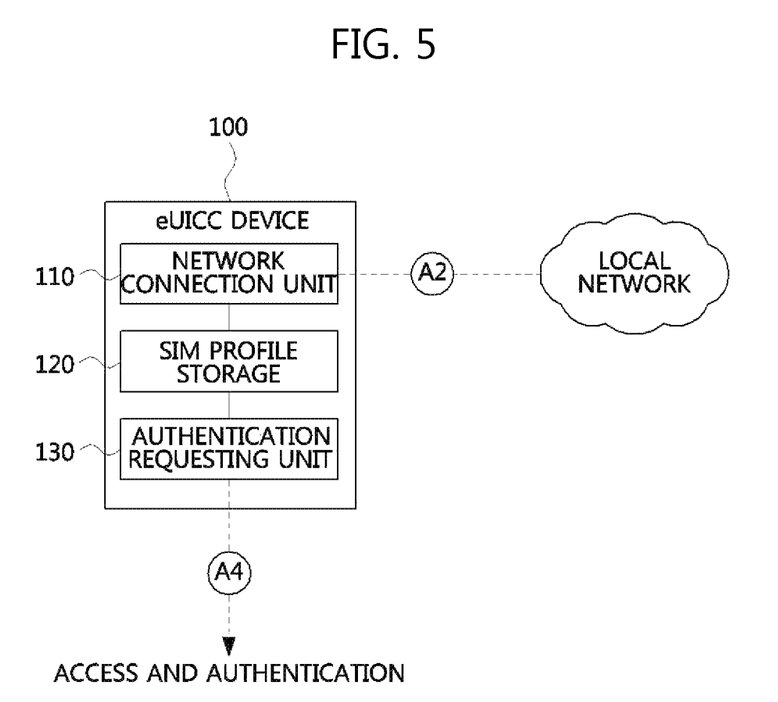
FIG. 5 is a conceptual diagram illustrating an eUICC device according to the embodiment of the present invention.

FIG. 5 is a conceptual diagram illustrating the eUICC device 100 according to the embodiment of the present invention. The eUICC device 100 will be described below with reference to FIG. 5.

The eUICC device 100 may include a network connection unit 110 configured to access the app store 300 via the local network 400, a SIM profile storage 120 configured to store the SIM profile application that is downloaded by accessing the app store through the network connection unit, and an authentication requesting unit 130 configured to access the operator server 200 based on the SIM profile information.

The network connection unit 110 may access the app store 300 using the user unique identification information (A2). The user unique identification information may use user unique credentials, for example, an ID and a password that can identify the user.

The SIM profile storage 120 may previously store the initial SIM profile 121 including the access information of the app store 300 when the eUICC device 100 is released. Moreover, it is possible to download and store the SIM profile 310 selected by the user by accessing the app store through the network connection unit. When the downloaded SIM profile application is executed, it is possible to replace previous initial SIM profile information with the SIM profile information provided by the selected operator and install the replaced SIM profile information.

In this case, when the replaced SIM profile information is invoked and activated using a method of, for example, rebooting, the authentication requesting unit 130 may access the selected operator server 200 and perform activation procedures for requesting authentication of the eUICC device according to the operator information of the SIM profile 122 information and the personal information necessary for authentication (A4).

Figure 6:
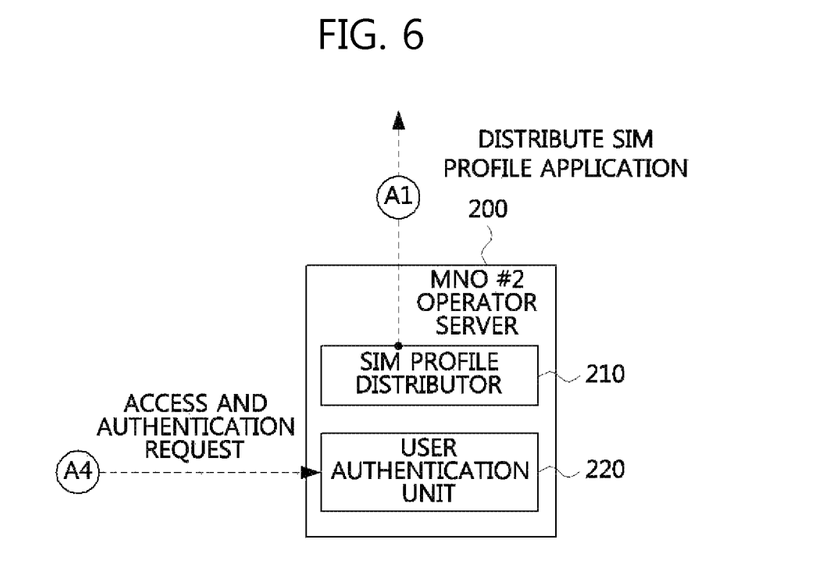
FIG. 6 is a conceptual diagram illustrating an operator server according to the embodiment of the present invention.

FIG. 6 is a conceptual diagram illustrating the operator server according to the embodiment of the present invention. The operator server 200 will be described below with reference to FIG. 6.

The operator server 200 may include a SIM profile distributor 210 configured to distribute the SIM profile application 310 to the app store 300, and a user authentication unit 220 configured to perform authentication procedures in response to the access and authentication request of the eUICC device in which the SIM profile application provided by the app store is downloaded and installed The SIM profile distributor 210 may distribute the SIM profile application 310 in a form of an application when the SIM profile application 310 is distributed to the app store 300. Further, it is possible to upload the SIM profile application 310 to the app store using the UI provided by the app store 300. Therefore, the user may select the distributed SIM profile application 310 directly using the UI or UX of the app store 300 that is used by the user.

The user authentication unit 220 may perform the authentication procedures based on the personal information necessary for authentication and the operator information included in the SIM profile of the user's eUICC device 100 (A4).

According to the embodiment of the present invention, it is possible to distribute the SIM profile application 310 using app stores of the operator that is operated in a variety of forms (A1), and install the SIM profile application using a user-friendly interface such as an app installation. In the app store 300, a history of the used SIM profile application per user is managed so that it is possible to manage the history for a user management (advertisement sending, operator recommendation, and plan recommendation).

While the present invention has been particularly described with reference to exemplary embodiments, it will be understood by those of skill in the art that various changes in form and details may be made without departing from the spirit and scope of the present invention. Therefore, the exemplary embodiments should be considered in a descriptive sense only and not for purposes of limitation. The scope of the present invention is defined not by the detailed description of the present invention but by the appended claims, and encompasses all modifications and equivalents that fall within the scope of the appended claims.

What is claimed is:

1. A method of providing a subscriber identification module (SIM) profile to an embedded universal integrated circuit card (eUICC) device, comprising:
downloading a SIM profile application selected by a user who uses the eUICC device from an app store;
executing the SIM profile application in the eUICC device and installing the application in the eUICC device; and
accessing of the eUICC device having the SIM profile application installed therein to an operator server, and authenticating the eUICC device based on SIM profile information corresponding to the SIM profile application, wherein in the executing of the SIM profile application in the eUICC device and installing of the application in the eUICC device, an initial SIM profile is replaced with the selected SIM profile when the downloaded SIM profile application is executed, wherein the initial SIM profile includes access information of the app store and is included in the eUICC device, the initial SIM profile being an existing SIM profile when the eUICC device is released, and wherein the app store and the operator server are separate entities.

2. The method of claim 1, wherein in the downloading of the SIM profile application selected by the user who uses the eUICC device from the app store, user unique identification information is used to access the app store via a local network.

3. The method of claim 1, wherein in the downloading of the SIM profile application selected by the user who uses the eUICC device from the app store, a user interface (UI) or user experience (UX) provided by the app store is used.

4. The method of claim 3, wherein in the downloading of the SIM profile application selected by the user who uses the eUICC device from the app store, the operator information is provided and at least one operator SIM profile application is listed using a category item of the app store.

5. The method of claim 1, further comprising distributing, by the operator server, the SIM profile application in a form of an application to the app store.

6. An embedded universal integrated circuit card (eUICC) device, comprising:
- a network connection unit configured to access an app store via a local network;
- a subscriber identification module (SIM) profile storage configured to store a SIM profile application that is downloaded by accessing the app store through the network connection unit; and
- an authentication requesting unit configured to access an operator server based on SIM profile information, wherein the SIM profile storage previously stores an initial SIM profile including access information of the app store, the initial SIM profile being an existing SIM profile when the eUICC device is released.

7. The device of claim 6, wherein the network connection unit accesses the app store via the local network using user unique identification information.

8. The device of claim 6, wherein in the SIM profile storage, the initial SIM profile is replaced with the SIM profile and is installed when the downloaded SIM profile application is executed.

9. The device of claim 8, wherein the authentication requesting unit requests authentication of the eUICC device by accessing the operator server based on the replaced SIM profile information.

10. An operator server, comprising:
- a subscriber identification module (SIM) profile distributor configured to distribute a SIM profile application to an app store; and
- a user authentication unit configured to perform authentication procedures in response to an access and authentication request of an embedded universal integrated circuit card (eUICC) device in which a SIM profile application provided by the app store is downloaded and installed, wherein the eUICC device includes an initial SIM profile which includes access information of the app store, the initial SIM profile being an existing SIM profile when the eUICC device is released.

11. The operator server of claim 10, wherein the SIM profile distributor uploads the SIM profile application to the app store using a user interface (UI) provided by the app store.

12. The operator server of claim 10, wherein the user authentication unit performs the authentication procedures based on personal information associated with authentication and operator information included in a SIM profile of the eUICC device.

* * * * *